(12) United States Patent
Yang

(10) Patent No.: US 11,673,422 B2
(45) Date of Patent: Jun. 13, 2023

(54) WHEEL RIM STRUCTURE

(71) Applicant: HSIN CHUAN IND. CO., LTD., Changhua County (TW)

(72) Inventor: Yu-Ling Yang, Changhua County (TW)

(73) Assignee: HSIN CHUAN IND. CO., LTD., Changhua County (TW)

(*) Notice: Subject to any disclaimer, the term of this patent is extended or adjusted under 35 U.S.C. 154(b) by 286 days.

(21) Appl. No.: 17/225,071

(22) Filed: Apr. 7, 2021

(65) Prior Publication Data
US 2022/0324254 A1    Oct. 13, 2022

(51) Int. Cl.
B60B 21/02 (2006.01)

(52) U.S. Cl.
CPC .................. B60B 21/026 (2013.01)

(58) Field of Classification Search
CPC ........ B60B 21/026; B60B 21/025; B60B 5/02
See application file for complete search history.

(56) References Cited

U.S. PATENT DOCUMENTS

| | | | |
|---|---|---|---|
| 5,651,591 A * | 7/1997 | Mercat | B60B 21/026 301/58 |
| 5,826,949 A * | 10/1998 | Bortoloni | B60B 21/028 301/95.101 |
| 6,213,562 B1 * | 4/2001 | Muraoka | B60B 1/0261 301/55 |
| 9,302,540 B2 * | 4/2016 | Hsu | B60B 21/00 |
| 9,579,928 B2 * | 2/2017 | Granieri | B60B 21/08 |
| 9,597,926 B1 * | 3/2017 | Hed | B60B 21/106 |
| 11,571,862 B2 * | 2/2023 | Brady | B29C 70/16 |

FOREIGN PATENT DOCUMENTS

DE       102017204769 A1 *  9/2018

* cited by examiner

*Primary Examiner* — Scott A Browne
(74) *Attorney, Agent, or Firm* — Che Yang Chen

(57) ABSTRACT

A wheel rim structure includes an integral frame body. The frame body has two side walls, a bottom wall, and a connecting rib. The bottom wall is integrally connected between bottom edges of the two side walls. The connecting rib is integrally connected between the two side walls and has a predetermined distance from the bottom wall. Inner wall surfaces of the side walls, the bottom wall and the connecting rib are formed with a plurality of crests arranged at intervals and a plurality of troughs each connected between every adjacent two of the crests. Outer wall surfaces of the side walls and the bottom wall are formed with a plurality of crests arranged at intervals and a plurality of troughs each connected between every adjacent two of the crests. The crests and the troughs form a continuous corrugated surface, which can withstand greater stress without causing surface wrinkles.

4 Claims, 3 Drawing Sheets

WHEEL RIM STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a wheel rim structure, and more particularly to a wheel rim structure having a frame body. The inner wall surface of the frame body has crests and troughs to form a corrugated surface.

Description of Related Arts

A conventional wheel rim, as shown in FIG. 1 and FIG. 2, has a frame body 10 made of aluminum alloy. The frame body 10 has two side walls 11, a bottom wall 12, and a connecting rib 13. The bottom wall 12 is integrally connected between the bottom edges of the two side walls 11. The connecting rib 13 is integrally connected between the two side walls 11 and has a predetermined distance from the bottom wall 12, so that the two side walls 11, the bottom wall 12 and the connecting rib 13 jointly surround a closed hollow area 14. The space above the top edge of the connecting rib 13 serves as a tire groove 15 for installation of a tire (not shown). The inner wall surfaces of the two side walls 11 each have a plurality of reinforcing ribs 16 arranged at predetermined intervals. With the above structure, a plurality of reinforcing ribs 16 enables the stress on the two side walls 11 of the wheel rim to be absorbed and dispersed by the reinforcing ribs 16 when the wheel rim is roundly shaped or assembled, so as to avoid surface wrinkles and deformation of the wheel rim caused by stress. However, because the reinforcing ribs 16 are spaced, that is, the inner wall surfaces of the two side walls 11 have flat sections, they will cause surface wrinkles and deformation when resisting stress.

Accordingly, the inventor of the present invention has devoted himself based on his many years of practical experiences to solve these problems.

SUMMARY OF THE PRESENT INVENTION

In order to solve the above problems, the primary object of the present invention is to provide a wheel rim structure. The wheel rim structure has a frame body. The inner wall surfaces of the side walls, the bottom wall and the connecting rib of the frame body as well as the outer wall surfaces of the side walls and the bottom wall are corrugated surfaces, which can withstand greater stress without causing surface wrinkles.

In order to achieve the above object, a wheel rim structure is provided. The wheel rim structure comprises an integral frame body. The frame body has two side walls, a bottom wall, and a connecting rib. The bottom wall is integrally connected between bottom edges of the two side walls. The connecting rib is integrally connected between the two side walls and has a predetermined distance from the bottom wall. Inner wall surfaces of the side walls, the bottom wall and the connecting rib are formed with a plurality of crests arranged at intervals and a plurality of troughs each connected between every adjacent two of the crests. Outer wall surfaces of the side walls and the bottom wall are formed with a plurality of crests arranged at intervals and a plurality of troughs each connected between every adjacent two of the crests.

Preferably, the crests and the troughs each have an arcuate, triangular or trapezoidal shape.

Preferably, the two side walls near the connecting rib are curved inwardly.

Preferably, the connecting rib is formed with a downward recess.

With the above structure, the crests and the troughs form a continuous corrugated surface, which can withstand greater stress without causing surface wrinkles.

DETAILED DESCRIPTION OF THE PREFERRED EMBODIMENT

Embodiments of the present invention will now be described, by way of example only, with reference to the accompanying drawings.

Figure 1:
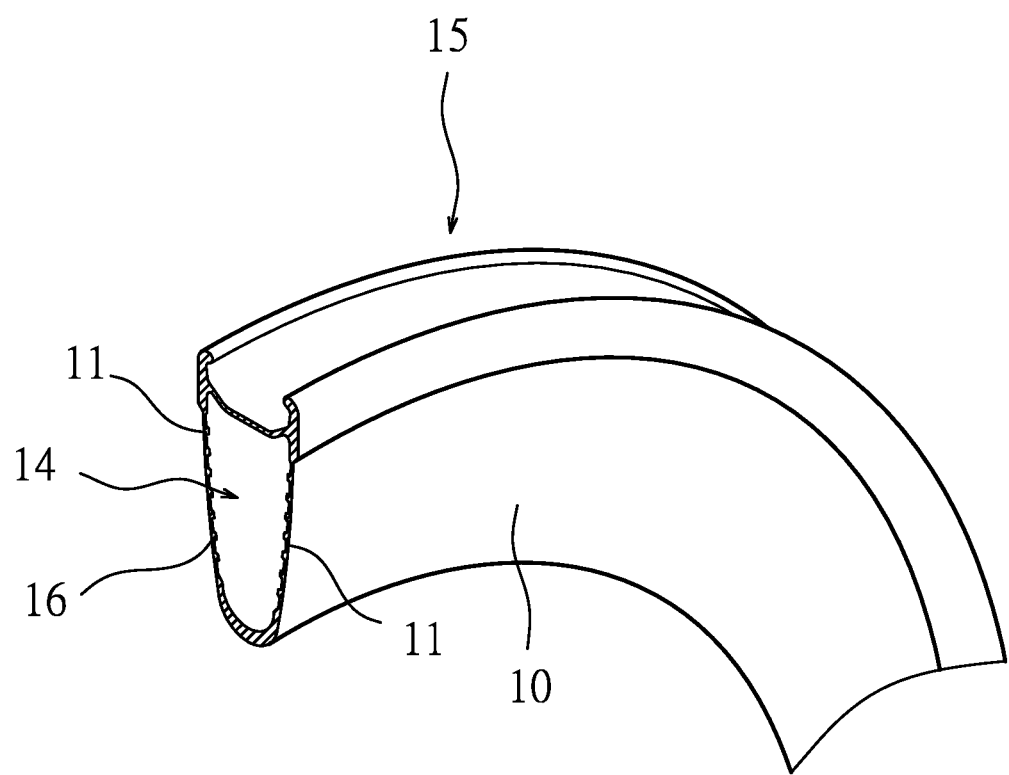
FIG. 1 is a partial perspective view of a conventional wheel rim.
Figure 2:
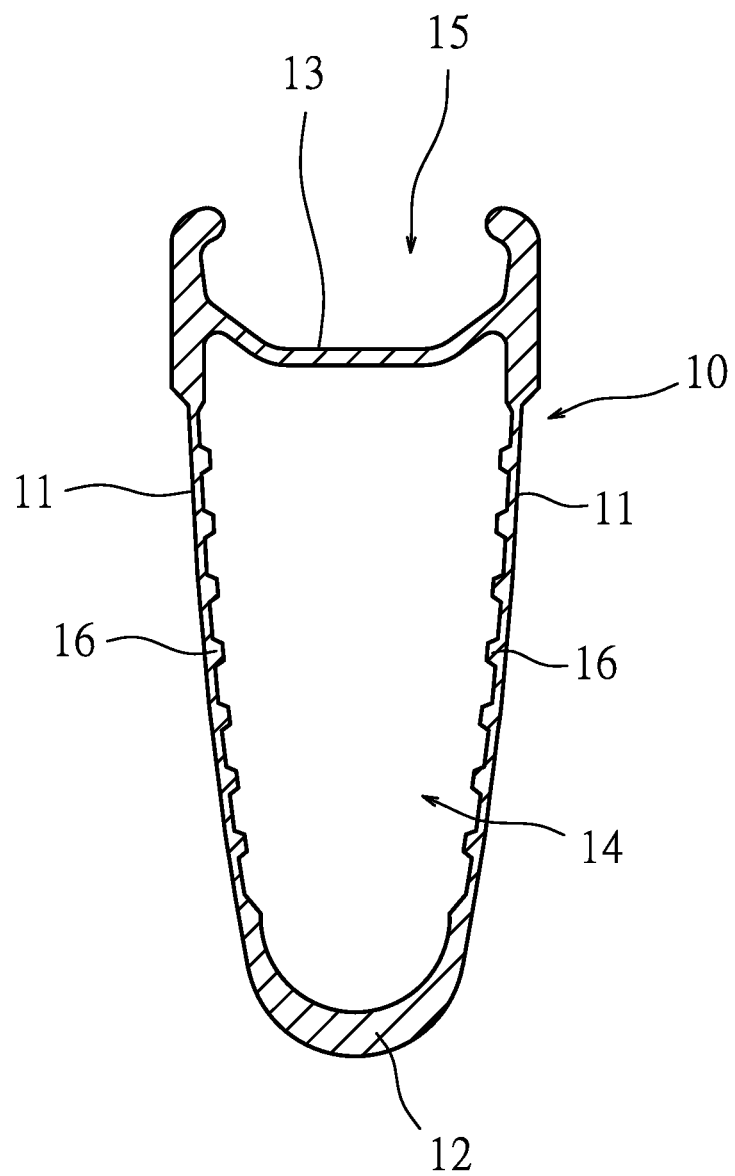
FIG. 2 is a cross-sectional view of the conventional wheel rim.
Figure 3:
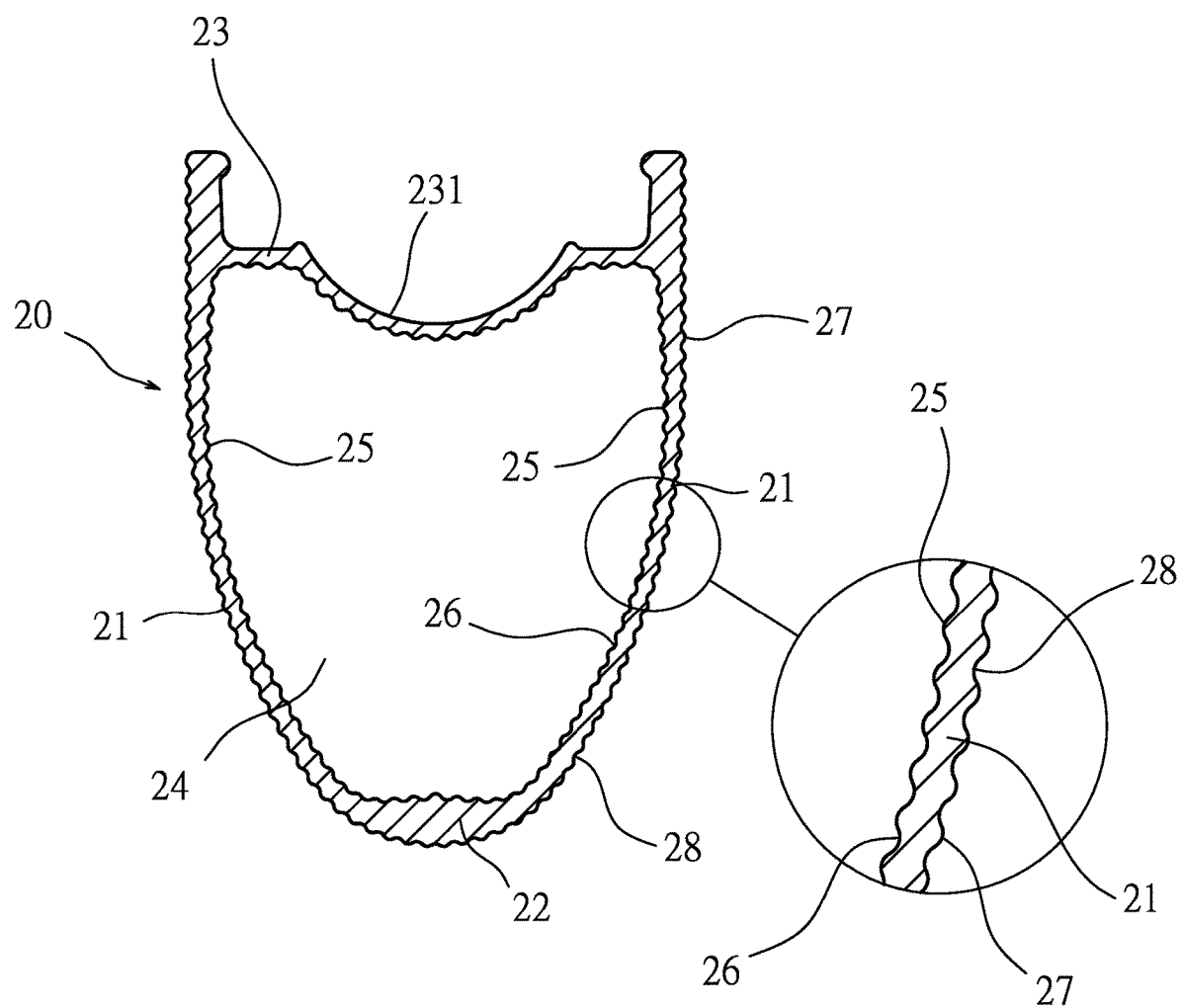
FIG. 3 is a cross-sectional view of the present invention.

Referring to FIG. 3, a wheel rim structure comprises an integral frame body 20. The frame body 20 has two side walls 21, a bottom wall 22, and a connecting rib 23. The bottom wall 22 is integrally connected between the bottom edges of the two side walls 21. The connecting rib 23 is integrally connected between the two side walls 21 and has a predetermined distance from the bottom wall 22, so that the two side walls 21, the bottom wall 22 and the connecting rib 23 jointly surround a closed hollow area 24. The inner wall surfaces of the side walls 21, the bottom wall 22 and the connecting rib 23 are formed with a plurality of crests 25 arranged at intervals and a plurality of troughs 26 each connected between every adjacent two of the crests 25. The outer wall surfaces of the side walls 21 and the bottom wall 22 are formed with a plurality of crests 27 arranged at intervals and a plurality of troughs 28 each connected between every adjacent two of the crests 27. With the above structure, the frame body 20 of the wheel rim can withstand greater stress and will not cause surface wrinkles and deformation when it is roundly shaped and assembled.

The assembly and function of the above embodiment are described in detail as below. Referring to FIG. 3, the crests 25, 27 and the troughs 26, 28 of the present invention are staggered and connected. In this way, the inner wall surfaces of the side walls 21, the bottom wall 22 and the connecting rib 23 as well as the outer wall surfaces of the side walls 21 and the bottom wall 22 are continuous corrugated surfaces. In other words, the corrugated surface allows the frame body 20 to have better endurance and pressure resistance than a simple flat surface, so the frame body 20 will not cause surface wrinkles when it is formed into a round shape or assembled to resist stress. The crests 25, 27 and the troughs 26, 28 each may have an arcuate, triangular, trapezoidal shape, etc. That is to say, they form non-planar surfaces to resist greater stress. Furthermore, the two side walls 21 near the connecting rib 23 are curved inwardly. The more curved side walls 21 have better strength against stress. The connecting rib 23 is formed with a downward recess 231, so that the connecting rib 23 forms a large curve to achieve better strength. It is worth mentioning that the crests 25, 27 and the troughs 26, 28 form continuous corrugated surfaces to increase the strength. Relatively, the frame body 20 can be reduced in thickness, thereby saving aluminum alloy materials and being lighter overall.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A wheel rim structure, comprising an integral frame body, the frame body having two side walls, a bottom wall, and a connecting rib; the bottom wall being integrally connected between bottom edges of the two side walls, the connecting rib being integrally connected between the two side walls and having a predetermined distance from the bottom wall, characterized in that: inner wall surfaces of the side walls, the bottom wall and the connecting rib are formed with a plurality of crests arranged at intervals and a plurality of troughs each connected between every adjacent two of the crests, outer wall surfaces of the side walls and the bottom wall are formed with a plurality of crests arranged at intervals and a plurality of troughs each connected between every adjacent two of the crests, such that the inner wall surfaces of the side walls, the bottom wall and the connecting rib as well as the outer wall surfaces of the side walls and the bottom wall are continuous corrugated surfaces.

2. The wheel rim structure as claimed in claim 1, wherein the crests and the troughs each have an arcuate, triangular or trapezoidal shape.

3. The wheel rim structure as claimed in claim 1, wherein the two side walls near the connecting rib are curved inwardly.

4. The wheel rim structure as claimed in claim 1, wherein the connecting rib is formed with a downward recess.

\* \* \* \* \*